United States Patent [19]

Merna et al.

[11] Patent Number: 5,239,312
[45] Date of Patent: Aug. 24, 1993

[54] INTERLACED INK JET PRINTING

[75] Inventors: Dennis J. Merna, Huntington Beach; Harold Berrey, Moorpark; Kam Wong, West Hills; Phil Severance, Westlake Village, all of Calif.

[73] Assignee: Dataproducts Corporation, Woodland Hills, Calif.

[21] Appl. No.: 474,556

[22] Filed: Feb. 2, 1990

[51] Int. Cl.⁵ .............................. B41J 2/01; B41J 2/15
[52] U.S. Cl. ............................. 346/1.1; 346/140 R; 400/126
[58] Field of Search ................. 346/140 R, 1.1, 75; 400/124, 121, 126; 358/298

[56] References Cited

U.S. PATENT DOCUMENTS

| | | | |
|---|---|---|---|
| 3,925,790 | 12/1975 | Fischbeck | 346/140 |
| 4,198,642 | 4/1980 | Gamblin | 346/75 |
| 4,232,324 | 11/1980 | Tsao | 346/75 |
| 4,242,003 | 12/1980 | Ragen | 400/124 |
| 4,272,771 | 6/1981 | Furukawa | 346/75 |
| 4,380,017 | 4/1983 | Ort | 346/140 R |
| 4,401,991 | 8/1983 | Martin | 346/75 |
| 4,509,058 | 4/1985 | Fischbeck | 346/1.1 |
| 4,528,576 | 7/1985 | Koumura et al. | 346/140 R |
| 4,533,925 | 8/1985 | Tsao et al. | 346/75 |
| 4,567,570 | 1/1986 | Peer | 364/900 |
| 4,580,148 | 4/1986 | Domoto et al. | 346/140 R |
| 4,593,295 | 7/1986 | Matsufjii et al. | 346/140 R |
| 4,632,579 | 12/1986 | Takano et al. | 400/121 |
| 4,709,247 | 11/1987 | Piatt et al. | 346/140 R |
| 4,737,041 | 4/1988 | Nakayama | 400/121 |
| 4,748,453 | 5/1988 | Lin et al. | 346/1.1 |
| 4,758,103 | 7/1988 | Angst et al. | 400/121 |
| 4,779,099 | 10/1988 | Lewis | 346/1.1 |
| 4,794,407 | 12/1988 | Vonasek | 346/139 R |
| 4,809,016 | 2/1989 | Padalino | 346/75 |
| 4,920,355 | 4/1990 | Katerberg | 346/1.1 |
| 5,070,345 | 12/1991 | Lahut et al. | 346/1.1 |

FOREIGN PATENT DOCUMENTS 0005884  1/1979  European Pat. Off. .

OTHER PUBLICATIONS

Fillmore, et al. "Ink Jet Splatter Reduction with Double Throughput", IBM Technical Disclosure Bulletin, vol. 21, No. 2, Jul. 1978.

*Primary Examiner*—Benjamin R. Fuller
*Assistant Examiner*—Alrick Bobb
*Attorney, Agent, or Firm*—Spensley Horn Jubas & Lubitz

[57] ABSTRACT

A pixel row interlacing method and system, and print head for practicing same, for use with dot-matrix ink jet printers which apply ink to a substrate as elevated temperatures (e.g., phase change ink jet printers), which assures environmentally symmetric ordered placement of molten ink droplets and, thereby, achieves seamless dot-matrix printing and minimizes the horizontal striping or "banding" effects which are prevalent in prior art printers. Odd rows of print region are printed in one pass and the even rows of the same region are printed in the following pass. The guidelines for laying down dots are essentially: (1) adjacent dot rows should not be laid down in the same pass; (2) each dot row should be sandwiched by either (a) virgin paper on both sides of the dot row, or (b) ink on both sides of the dot row; (3) the first and the last dot row in each solid pattern are exempted from guidelines #2 and #3.

31 Claims, 6 Drawing Sheets

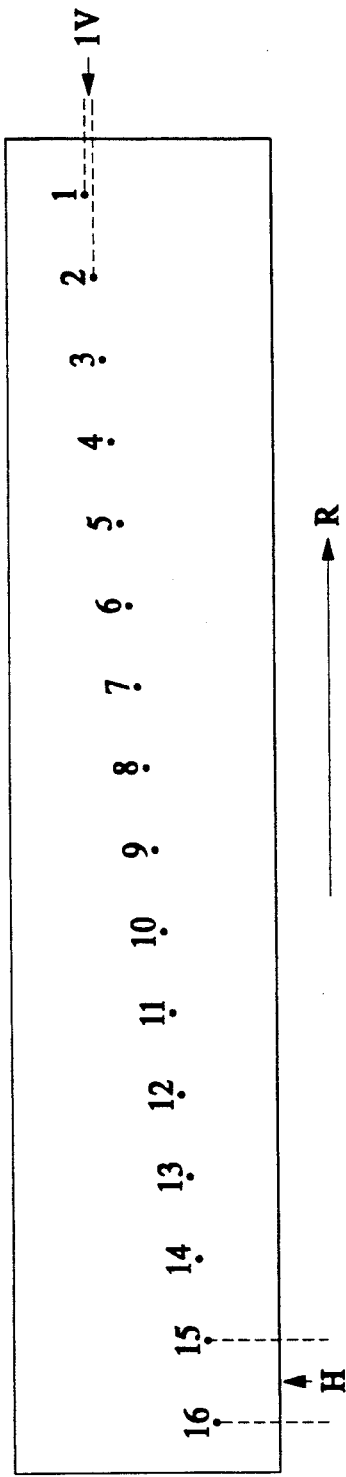
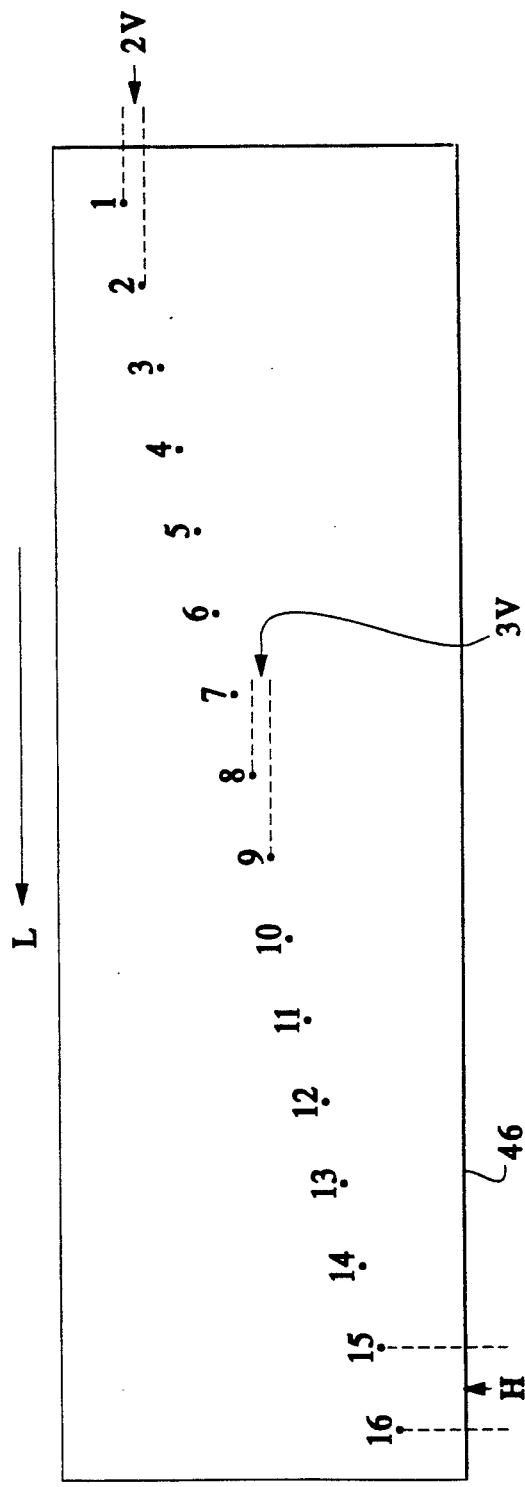

| Pixel Row | Pass 1 Jet j | Pass 2 Jet j | Pass 3 Jet j | Pass 4 Jet j |
|---|---|---|---|---|
| 1 | 1 | | | |
| 2 | 2 | | | |
| 3 | 3 | | | |
| 4 | 4 | | | |
| 5 | 5 | | | |
| 6 | 6 | | | |
| 7 | 7 | | | |
| 8 | 8 | | | |
| 9 | 9 | | | |
| 10 | 10 | | | |
| 11 | 11 | | | |
| 12 | 12 | | | |
| 13 | 13 | | | |
| 14 | 14 | | | |
| 15 | 15 | | | |
| 16 | 16 | | | |
| 17 | | 1 | | |
| 18 | | 2 | | |
| 19 | | 3 | | |
| 20 | | 4 | | |
| 21 | | 5 | | |
| 22 | | 6 | | |
| 23 | | 7 | | |
| 24 | | 8 | | |
| 25 | | 9 | | |
| 26 | | 10 | | |
| 27 | | 11 | | |
| 28 | | 12 | | |
| 29 | | 13 | | |
| 30 | | 14 | | |
| 31 | | 15 | | |
| 32 | | 16 | | |
| 33 | | | 1 | |
| 34 | | | 2 | |
| 35 | | | 3 | |
| 36 | | | 4 | |
| 37 | | | 5 | |
| 38 | | | 6 | |
| 39 | | | 7 | |
| 40 | | | 8 | |
| 41 | | | 9 | |
| 42 | | | 10 | |
| 43 | | | 11 | |
| 44 | | | 12 | |
| 45 | | | 13 | |
| 46 | | | 14 | |
| 47 | | | 15 | |
| 48 | | | 16 | |
| 49 | | | | 1 |
| 50 | | | | 2 |
| 51 | | | | 3 |
| 52 | | | | 4 |
| 53 | | | | 5 |
| 54 | | | | 6 |
| 55 | | | | 7 |
| 56 | | | | 8 |
| 57 | | | | 9 |
| 58 | | | | 10 |
| 59 | | | | 11 |
| 60 | | | | 12 |
| 61 | | | | 13 |
| 62 | | | | 14 |
| 63 | | | | 15 |
| 64 | | | | 16 |

(PRIOR ART)

Figure 2

| Pixel Row | Pass 1 Jet j | Pass 2 Jet j | Pass 3 Jet j | Pass 4 Jet j |
|---|---|---|---|---|
| 1 | 1 | | | |
| 2 | | | | |
| 3 | 2 | | | |
| 4 | | | | |
| 5 | 3 | | | |
| 6 | | | | |
| 7 | 4 | | | |
| 8 | | | | |
| 9 | 5 | | | |
| 10 | | | | |
| 11 | 6 | | | |
| 12 | | | | |
| 13 | 7 | | | |
| 14 | | | | |
| 15 | 8 | | | |
| 16 | | | | |
| 17 | | 1 | | |
| 18 | 9 | | | |
| 19 | | 2 | | |
| 20 | 10 | | | |
| 21 | | 3 | | |
| 22 | 11 | | | |
| 23 | | 4 | | |
| 24 | 12 | | | |
| 25 | | 5 | | |
| 26 | 13 | | | |
| 27 | | 6 | | |
| 28 | 14 | | | |
| 29 | | 7 | | |
| 30 | 15 | | | |
| 31 | | 8 | | |
| 32 | 16 | | | |
| 33 | | | 1 | |
| 34 | | 9 | | |
| 35 | | | 2 | |
| 36 | | 10 | | |
| 37 | | | 3 | |
| 38 | | 11 | | |
| 39 | | | 4 | |
| 40 | | 12 | | |
| 41 | | | 5 | |
| 42 | | 13 | | |
| 43 | | | 6 | |
| 44 | | 14 | | |
| 45 | | | 7 | |
| 46 | | 15 | | |
| 47 | | | 8 | |
| 48 | | 16 | | |
| 49 | | | | 1 |
| 50 | | | 9 | |
| 51 | | | | 2 |
| 52 | | | 10 | |
| 53 | | | | 3 |
| 54 | | | 11 | |
| 55 | | | | 4 |
| 56 | | | 12 | |
| 57 | | | | 5 |
| 58 | | | 13 | |
| 59 | | | | 6 |
| 60 | | | 14 | |
| 61 | | | | 7 |
| 62 | | | 15 | |
| 63 | | | | 8 |
| 64 | | | 16 | |

Figure 4

| Pixel Row | Pass 1 Jet j | Pass 2 Jet j | Pass 3 Jet j | Pass 4 Jet j | Pass 5 Jet j |
|---|---|---|---|---|---|
| 1 |  | 1 |  |  |  |
| 2 | 9 |  |  |  |  |
| 3 |  | 2 |  |  |  |
| 4 | 10 |  |  |  |  |
| 5 |  | 3 |  |  |  |
| 6 | 11 |  |  |  |  |
| 7 |  | 4 |  |  |  |
| 8 | 12 |  |  |  |  |
| 9 |  | 5 |  |  |  |
| 10 | 13 |  |  |  |  |
| 11 |  | 6 |  |  |  |
| 12 | 14 |  |  |  |  |
| 13 |  | 7 |  |  |  |
| 14 | 15 |  |  |  |  |
| 15 |  | 8 |  |  |  |
| 16 | 16 |  |  |  |  |
| 17 |  |  | 1 |  |  |
| 18 |  | 9 |  |  |  |
| 19 |  |  | 2 |  |  |
| 20 |  | 10 |  |  |  |
| 21 |  |  | 3 |  |  |
| 22 |  | 11 |  |  |  |
| 23 |  |  | 4 |  |  |
| 24 |  | 12 |  |  |  |
| 25 |  |  | 5 |  |  |
| 26 |  | 13 |  |  |  |
| 27 |  |  | 6 |  |  |
| 28 |  | 14 |  |  |  |
| 29 |  |  | 7 |  |  |
| 30 |  | 15 |  |  |  |
| 31 |  |  | 8 |  |  |
| 32 |  | 16 |  |  |  |
| 33 |  |  |  | 1 |  |
| 34 |  |  | 9 |  |  |
| 35 |  |  |  | 2 |  |
| 36 |  |  | 10 |  |  |
| 37 |  |  |  | 3 |  |
| 38 |  |  | 11 |  |  |
| 39 |  |  |  | 4 |  |
| 40 |  |  | 12 |  |  |
| 41 |  |  |  | 5 |  |
| 42 |  |  | 13 |  |  |
| 43 |  |  |  | 6 |  |
| 44 |  |  | 14 |  |  |
| 45 |  |  |  | 7 |  |
| 46 |  |  | 15 |  |  |
| 47 |  |  |  | 8 |  |
| 48 |  |  | 16 |  |  |
| 49 |  |  |  |  | 1 |
| 50 |  |  |  | 9 |  |
| 51 |  |  |  |  | 2 |
| 52 |  |  |  | 10 |  |
| 53 |  |  |  |  | 3 |
| 54 |  |  |  | 11 |  |
| 55 |  |  |  |  | 4 |
| 56 |  |  |  | 12 |  |
| 57 |  |  |  |  | 5 |
| 58 |  |  |  | 13 |  |
| 59 |  |  |  |  | 6 |
| 60 |  |  |  | 14 |  |
| 61 |  |  |  |  | 7 |
| 62 |  |  |  | 15 |  |
| 63 |  |  |  |  | 8 |
| 64 |  |  |  | 16 |  |

Figure 5

| Pixel Row | Pass 1 Jet j | Pass 2 Jet j | Pass 3 Jet j | Pass 4 Jet j | Pass 5 Jet j |
|---|---|---|---|---|---|
| 1 | 9 | 1 | | | |
| 2 | 10 | 2 | | | |
| 3 | 11 | 3 | | | |
| 4 | 12 | 4 | | | |
| 5 | 13 | 5 | | | |
| 6 | 14 | 6 | | | |
| 7 | 15 | 7 | | | |
| 8 | 16 | 8 | | | |
| 9 | | 9 | 1 | | |
| 10 | | 10 | 2 | | |
| 11 | | 11 | 3 | | |
| 12 | | 12 | 4 | | |
| 13 | | 13 | 5 | | |
| 14 | | 14 | 6 | | |
| 15 | | 15 | 7 | | |
| 16 | | 16 | 8 | | |
| 17 | | | 9 | 1 | |
| 18 | | | 10 | 2 | |
| 19 | | | 11 | 3 | |
| 20 | | | 12 | 4 | |
| 21 | | | 13 | 5 | |
| 22 | | | 14 | 6 | |
| 23 | | | 15 | 7 | |
| 24 | | | 16 | 8 | |
| 25 | | | | 9 | 1 |
| 26 | | | | 10 | 2 |
| 27 | | | | 11 | 3 |
| 28 | | | | 12 | 4 |
| 29 | | | | 13 | 5 |
| 30 | | | | 14 | 6 |
| 31 | | | | 15 | 7 |
| 32 | | | | 16 | 8 |
| 33 | | | | | 9 |
| 34 | | | | | 10 |
| 35 | | | | | 11 |
| 36 | | | | | 12 |
| 37 | | | | | 13 |
| 38 | | | | | 14 |
| 39 | | | | | 15 |
| 40 | | | | | 16 |
| 41 | | | | | |
| 42 | | | | | |
| 43 | | | | | |
| 44 | | | | | |
| 45 | | | | | |
| 46 | | | | | |
| 47 | | | | | |
| 48 | | | | | |
| 49 | | | | | |
| 50 | | | | | |
| 51 | | | | | |
| 52 | | | | | |
| 53 | | | | | |
| 54 | | | | | |
| 55 | | | | | |
| 56 | | | | | |
| 57 | | | | | |
| 58 | | | | | |
| 59 | | | | | |
| 60 | | | | | |
| 61 | | | | | |
| 62 | | | | | |
| 63 | | | | | |
| 64 | | | | | |

Figure 6

INTERLACED INK JET PRINTING

FIELD OF THE PRESENT INVENTION

The present invention is directed toward phase change ink jet printers and, more particularly, to an improved method, system and print head for printing therewith which minimize appearance abnormalities when printing solid geometric shapes.

BACKGROUND OF THE PRESENT INVENTION

In phase change (also referred to as thermoplastic or hot melt) ink jet printers, the ink itself is typically a wax-like o substance which is solid (frozen) at room temperature, becoming liquid when heated. Once in liquid form, a suitable ink-jetting mechanism of the drop-on-demand (also known as impulse) or continuous types—both of which are equally applicable to the present invention—is employed to deposit the ink a drop at a time on a surface (also referred to as the substrate or print medium), typically, but not necessarily, paper. [Hereafter, the term "paper" is used to include paper and all other print substrates or medium.] Upon contact with the paper surface the ink resolidifies.

In an impulse ink jet apparatus, a piezoelectric transducer (or like device) encircling a chamber of ink is selectively energized in response to the application of a voltage thereby causing the transducer to contract so as to jet out (expel) a droplet of ink through an orifice in the print head toward the substrate. The voltage is then removed to de-energize the transducer thereby causing it to expand and be refilled with ink from the chamber. Thus, the ink is ejected "on demand" in that the ink is ejected only when the transducer is energized. On the other hand, in continuous ink jet printers the ink droplets are continuously ejected at regular intervals and deflected away from the substrate where not desired. See, for example, U.S. Pat. Nos. 3,715,219 and 3,653,932 for a disclosure of a continuous jet with a phase change ink and such patents are hereby incorporated by reference.

For a discussion of phase change inks and the use thereof in impulse ink jet apparatuses suitable for application of the present invention, reference is made to the following patents and patent applications, all of which are assigned to the same assignee as the present invention and all of which are hereby incorporated herein by reference:

(1) U.S. Pat. No. 4,390,369 to Merrit et al. entitled "Natural Wax-Containing Ink Jet Inks" which issued Jun. 28, 1983.

(2) Pending U.S. patent application Ser. No. 146,211 entitled "Hot Melt Ink Jet With Dispersing Solid Pigment In A Hot Melt Vehicle," filed on Jan. 1, 1988 which is a continuation of Ser. No. 006,727 filed on Jan. 23, 1987 (now abandoned), which is in turn a continuation of Ser. No. 668,095 filed on Nov. 5, 1984 (now abandoned).

(3) U.S. Pat. No. 4,459,601 to Howkins entitled "Ink jet Method and Apparatus" which issued on Jul. 10, 1984.

(4) U.S Pat No. 4,791,439 to Guiles entitled "Ink Jet Apparatus With Improved Reservoir System For Handling Hot Melt Ink" which issued on Dec. 13, 1988.

(5) Pending U.S. patent application Ser. No. 093,151 entitled "A Demand Ink Jet Utilizing A Phase Change Ink And Method Of Operating," filed on Sep. 2, 1987 and currently on appeal which is a continuation of Ser. No. 938,334 filed on Dec. 4, 1986 (now abandoned), which is a continuation of Ser. No. 610,627 filed on May 16, 1984 (now abandoned).

Suitable ink jet print heads include those comprised of a stacked, slanted linear array of nozzles, typically $2^n$ nozzles where n is a positive integer (e.g., 16, 32, 48 or 64 individual nozzles), each nozzle being driven by a separate piezoelectric powered piston pump or similar actuator. By way of example only, the following discussion is based on a 16-nozzle print head as shown in FIG. 1. Although not drawn to scale in FIG. 1, a suitable horizontal distance H between two adjacent nozzles (called the inter-jet spacing) is 14/240 inches, while a suitable vertical distance V between two adjacent nozzles is 1/240 inches.

The paper may be viewed as being comprised of a plurality of parallel horizontal rows—called pixel (picture element) rows—upon which dots (droplets) of ink may be placed. The vertical distance between the pixel rows is the same as the vertical distance V between the nozzles of the print head. Each of the 16 nozzles is responsible for the coverage of one pixel row per print pass. During a first print pass as the head is shuttled in a first direction R (left to right in FIG. 1) it is possible, by firing all nozzles throughout the pass, to print essentially 16 pixel rows of dots. The result is an essentially solid block of ink on the paper having a height of approximately 15*V.

The paper may then be stepped or advanced (typically through use of a stepper motor) vertically by 16 pixel rows (i.e., 16*V) after completion of each print pass so that the next 16 pixel rows of the paper may be printed on. [Since what is important is relative movement between the print head and the substrate, alternatively, the print head can be moved or the print head and substrate can both be moved.] Then, during a second print pass as the head is shuttled in a second direction L (right to left in FIG. 1) it is possible, by firing all nozzles throughout the pass, to print the next 16 pixel rows. By repeating the process for successive passes of the print head, larger and larger areas of the paper may be "blocked in." This is especially important when printing graphics having solid regions of significant size.

FIG. 2 shows the nozzles fired during the first four passes of the print head and the pixel rows which each nozzle fills. In a first pass (left to right; direction R), nozzles 1-16 are fired (as indicated by the nozzle number which is encircled) onto pixel rows 1-16. The paper is then stepped so as to position pixel row 17 opposite nozzle 1. Then, in a second pass (right to left; direction L), nozzles 1-16 are fired onto pixel rows 17-32. The paper is then stepped so as to position pixel row 33 opposite nozzle 1. Then, in a third pass (left to right; direction R), nozzles 1-16 are fired onto pixel rows 33-48. The paper is then stepped so as to position pixel row 49 opposite nozzle I. Then, in a fourth pass (right to left; direction L), nozzles 1-16 are fired onto pixel rows 49-64.

STATEMENT OF THE PROBLEM ENCOUNTERED

When printing solid geometric shapes which are greater than 16 pixel rows high (or, greater than n pixel rows high where n is the number of nozzles), the image rendered appears as if it were constructed of neatly fitted horizontal segments or "bands"; each segment comprised of 16 pixel rows. Closer inspection reveals variations in inter-band thickness along the y-axis (i.e., the horizontal rows comprising each band are not of universal or constant thickness), and even more objectional horizontal "seams" of approximately single pixel height which border the upper and lower band boundaries (i.e., the border between the lowest row of a first band and the upper row of the next band are significantly different in thickness).

When a solid pattern is printed by a serial dot matrix printer, the pattern is typically broken by the seam created by either underlapping or overlapping in between adjacent printing passes. This problem can usually be solved by maintaining good paper stepping accuracy. However, such has not been the experience of the inventors when a phase change ink is employed.

OBJECTIVE OF THE PRESENT INVENTION

It is an objective of the present invention to provide a method, system and print head for use in and by a phase change ink jet printer, which reduces or eliminates undesirable "banding" and "seaming."

SUMMARY OF THE PRESENT INVENTION

Isolating The Primary Causes Of Banding And Seaming

It is believed that the thickness variations are the result of instantaneous thermal, absorptive and adhesive/cohesive asymmetries between adjacent pixel rows which are present during the solidification phase of the ink on the paper. Also, the velocity component imparted to the jetted droplets by the shuttling head causes each droplet to deform in a directionally dependent way along the x-axis (i.e., the print head moves in a first direction R along the x-axis for a first pass, and in the opposite direction L along the x-axis for the next pass; each droplet deforms in the direction of movement of the print head).

Banding

With respect to any given vertical page axis, hot jetted ink droplets laid down by the leading jet of the print head encounter an almost room temperature print surface.

Succeeding ink droplets are placed down only milliseconds apart in time by succeeding jets, each of which in turn accumulatively contribute toward a larger, slower-to-cool thermal mass along the y-axis. The amount of ink absorbed into the page is proportional to the period of time that the ink remains on paper in a molten state. Experimental test results indicate that the leading jet droplets do not penetrate as deeply as the trailing jet droplets. Experimental results further indicate that banding occurs even when the substrate printed on is a nonporous (acetate) surface.

Seaming

Seaming, the presence of sharp discontinuities in apparent luminance at each band boundary (i.e., the border between the lowest row of a first band and the upper row of the next band), appears to result from asymmetries in the thermal conductivity and adhesivity/cohesivity of the print surface, and the deforming effects of x-axis velocity on each jetted droplet upon contact with the print surface. The top row of each successive band printed is initially bordered on the top by the solidified ink of the preceding print band and on the bottom by clean white paper. It is believed that droplets formed in each of these "top rows" are subjected to cohesive forces (ink-ink) above and adhesive forces (ink-paper) below each print band. These forces are believed to contribute uniquely to the distortion of newly solidifying droplets.

Also, ink droplets face some degree of distortion due to their x-velocity component of travel which is present upon contact with the print surface. This distortion increases with higher head shuttle velocities resulting in tadpole-like drop formations on the page, with the body preceding the tail along the x-axis. Each print band is formed by a block of tadpole-like droplets which point unidirectionally to the right or to the left (depending on the direction movement of the print head during the pass), alternating direction from band to band (with the alternating direction of the print head). Variations in apparent texture between adjacent bands show up as major discontinuities at band boundaries, even after corrective x-offset drop trajectory compensation is performed to align pixel columns between adjacent print bands.

Solution To The Problem

The present invention is directed to a unique row-interleaved printing method and system which minimizes undesirable banding and seaming by maintaining the maximum practical thermal, absorptive and adhesive/cohesive symmetry between newly forming pixel rows on the print surface, while breaking up the low frequency patterns caused by velocity-altered, print direction dependent dot geometries. More particularly, in one embodiment of the method and system of the present invention, no two adjacent rows are printed during the same pass of the print head. In this way, any dot in a given row is printed only when either (1) there is no corresponding dot in the two adjacent rows; or (2) there is no corresponding dot in one adjacent row, there is a corresponding dot in the other adjacent row but the thermal impact thereof has dissipated; or (3) there is a corresponding dot in the both adjacent rows but the thermal impact thereof has dissipated. Thus, thermal symmetry is maintained with respect to vertically adjacent dots. Additionally, no two adjacent rows are printed during a pass lo of the print head in the same direction (i.e., every row is printed during a pass of the print head in a direction opposite to that of the pass during which the rows adjacent thereto are printed). In this way, there is a breaking up of the low frequency patterns caused by velocity-altered, print direction dependent dot geometries.

Thus, the following guidelines of printing are preferably followed in order to minimize the non-uniformity in a solid pattern:

1) Adjacent dot rows should not be laid down in the same pass.
2) Each dot row should be sandwiched by either (a) virgin paper on both sides of the dot row, or (b) ink on both sides of the dot row. If a dot row is laid down with ink on one side and virgin paper on the other side, non-uniformity would be the result.
3) The first and the last dot row in each solid pattern are exempted from guidelines #2 and #3.

The following are the reasons behind the above guidelines:

1) Guideline #1 is to prevent adjacent dot rows to fuse together forming a band of dots per pass.
2) Guideline #2 is to maintain thermal symmetry within a solid pattern.

3) The first and the last dot row of each printed pattern is exempted from the symmetry requirement because these rows represent the transition from one color to another and therefore do not have to be uniform or symmetrical on both sides of the dot row.

BRIEF DESCRIPTION OF THE DRAWINGS

FIG. 1 is a schematic drawing of a 16-nozzle print head which may be used to practice the present invention.

FIG. 2 is a table or chart showing what jets are activated (fired) and the pixel rows they cover using the print head of FIG. 1 without practicing the present invention.

FIG. 3 is a schematic drawing of another 16-nozzle print head which may be used to practice the present invention.

FIG. 4 is a table or chart showing what jets are activated (fired) and the pixel rows they cover in the first four passes using the print head of FIG. 3 when practicing an embodiment of the present invention.

FIG. 5 is a table or chart showing what jets are activated (fired) and the pixel rows they cover in the first four passes using the print head of FIG. 3 when practicing another embodiment of the present invention.

FIG. 6 is a table or chart showing what jets are activated (fired) and the pixel rows they cover in the first five passes using the print head of FIG. 1 when practicing another embodiment of the present invention.

DESCRIPTION OF THE PREFERRED EMBODIMENTS

First Preferred Embodiment

Figure 7:
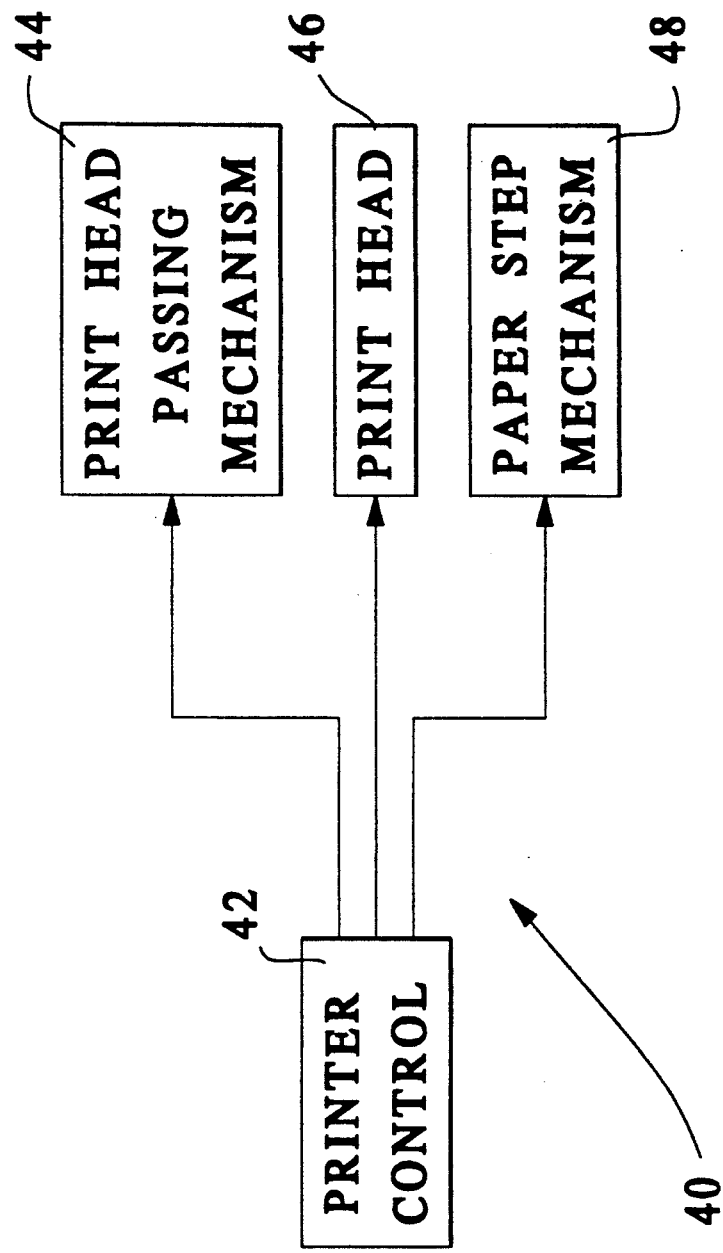
FIG. 7 is a general block diagram illustrating an apparatus for interlaced jet printing according to one embodiment of the present invention.

In a first embodiment of the present invention, the print head of FIG. 1 is modified so that the vertical spacing between adjacent nozzles is doubled from V to 2*V (i.e., from 1 pixel row to two pixel rows). In addition, the distance between two interior nozzles in the middle of the print head is increased by an additional V (i.e., 1 pixel row) to a total of 3*V (i.e., 3 pixel rows). The position of these two interior nozzles, designated j and k, are identified as follows:

$$j = 0.5 \, m \text{ and } k = 0.5 \, m + 1,$$

wherein m (an even number) is the number of nozzles in the print head. In the illustrated embodiment, the print head has an even number of nozzles m=16. Hence, for this print head, the middle nozzles j and k having increased spacing are the 8th and 9th nozzles of the 16 nozzles of the print head. Thus, the distance between the 8th and 9th nozzles is increased by an additional V (i.e., 1 pixel row) to a total of 3*V (i.e., 3 pixel rows). This is shown in FIG. 3 (not drawn to scale). In this way, when the paper is positioned to have pixel row 1 opposite nozzle 1, the following pixel row/nozzle arrangement is achieved: 1/1, 3/2, 5/3, 7/4, 9/5, 11/6, 3/7, 15/8 for the upper 8 jets (1 to 8); and 18/9, 20/10, 22/11, 4/12, 26/13, 28/14, 30/15 and 32/16 for the lower 8 jets (9 to 16). This print head is shown in FIG. 3 and is indicated at 46. FIG. 7 shows the print head 46 included in an ink jet printer configuration 40. A controller 42 commands a paper step mechanism 48 to position the substrate opposite the print head 46. The controller 42 then commands a print head passing mechanism 44 to pass the print head 46 across the substrate, wherein the ink jet nozzles on the print head are activated accordingly. At the end of each pass, the paper step mechanism 48 advances the substrate and positions the substrate opposite the print head 46 in preparation for another pass as directed by the controller 42. A method in accordance with one embodiment of the present invention is described as follows, with reference to FIG. 4 which shows the position of all the nozzles (indicated by the nozzle number) relative to the pixel rows of the paper and the nozzles fired (indicated by the nozzle number being encircled) during the first four passes of the print head and the pixel rows which each fired nozzle fills:

(1) In the first pass (left to right; direction R), the paper is positioned to have pixel row 1 opposite nozzle 1 as described above. During the first pass, only the lower 8 jets 9, 10, 11, 12, 13, 14, 15 and 16 are activated to cover pixel rows 18, 20, 22, 24, 26, 28, 30 and 32, respectively. The upper 8 jets (1 to 8) are NOT fired.

(2) The paper is then stepped upward by a step of 16 pixel rows, thereby positioning the paper to have the 17th pixel row opposite nozzle 1 and the following pixel row/nozzle arrangement is achieved: 17/1, 19/2, 21/3, 23/4, 25/5, 27/6, 29/7 and 31/8 for the upper 8 jets (1 to 8); and 34/9, 36/10, 38/11, 40/12, 42/13, 44/14, 46/15 and 48/16 for the lower 8 jets (9 to 16). During the second pass (right to left; direction L), the top 8 jets (1 to 8) covers pixel rows 17, 19, 21, 23, 25, 27, 29, 31. With the exception of row 17, all of them are sandwiched between two pixel rows of ink that were printed in the previous pass thus satisfying guideline #2. Pixel row #17 is the first pixel row of the pattern therefor satisfying guideline #3. The bottom 8 jets (9 to 16) covers pixel rows 34, 36, 38, 40, 42, 44, 46, 48. All these rows are printed on virgin paper therefore satisfying guideline #2.

(3) At the end of the second pass, the paper is advanced by a step of 16 pixel rows (pixels), thereby positioning the paper to have the 33rd pixel row opposite nozzle 1 and the following pixel row/nozzle arrangement is achieved 33/1, 35/2, 37/3, 39/4, 41/5, 43/6, 45/7 and 47/8 for the upper 8 jets (1 to 8); and 50/9, 52/10, 54/11, 56/12, 58/13, 60/14, 62/15 and 64/16 for the lower 8 jets (9 to 16). During the third pass (left to right; direction R), the top 8 jets (1 to 8) covers pixel rows 33, 35, 37, 39, 41, 43, 45, 47. All of them are sandwiched between two pixel rows of ink that was printed in the previous pass thus satisfying guideline #2. The bottom 8 jets (9 to 16) covers pixel rows 50, 52, 54, 56, 58, 60, 62, 64. All these rows are printed on virgin paper therefore satisfying guideline #2.

(4) At the end of the third pass, the paper is advanced by a step of 16 pixel rows (pixels), thereby positioning the paper to have the 49th pixel row opposite nozzle 1 and the following pixel row/nozzle arrangement is achieved: 49/1, 51/2, 53/3, 55/4, 57/5, 59/6, 61/7 and 63/8 for the upper 8 jets (1 to 8). During the fourth pass (right to left; direction L), the top 8 jets (1 to 8) covers pixel rows 49, 51, 53, 55, 57, 59, 61, 63. All of them are sandwiched between two pixel rows of ink that was printed in the previous pass thus satisfying guideline #2. The bottom 8 jets (9 to 16) are NOT jetted. This completes the process for a printing a block of 48 pixel rows, namely, rows 17 to 64 (inclusive). The actual print region on the paper can be increased to include pixel rows 1 to 16 by simply beginning the first pass (left to right;

direction R) with the paper positioned so to have pixel row 2 opposite nozzle 9 (nozzles 1-8 thus would be above the first pixel row), and increasing the number of passes by one; this is shown in FIG. 5. Likewise, the print region on the paper can be increased to include pixel rows beyond row 64 by simply increasing the number of passes before the last pass in which the bottom jets are not fired.

It is through this operational example that the "symmetry" of printing is evident. The leading (lower) jets 9 to 16 print out rows that are individually surrounded on both sides by one or more pixel rows of paper. The trailing (upper) jets 1 to 8 jet ink onto unprinted (virgin) rows which are symmetrically bounded by rows of solidified ink from the previous print pass. In either case, thermal, adhesive/cohesive and absorptive symmetries exist both below and above each freshly jetted pixel row.

Upon closer observation of print samples rendered by this interleave technique, it is evident that seams may still occur, but of a different nature. The main difference is in their composition and frequency of occurrence. One seam per row is evident now instead of 1 seam per 16 rows. Put another way, band height has been reduced to that of a single pixel row resulting in a very fine, horizontally aligned, image texture.

Effectively, the banding pattern has been raised to a spatial frequency which is far less noticeable to the naked eye, though still somewhat visible. It has been shown that post thermal processing of interlaced images will cause the individual rows of solidified ink to remelt, diffusing deep into the paper, effectively eliminating any and all visible remnants of seams. This post processing, while effective in fusing all ink into the paper of non-interlaced images, fails to significantly reduce the visible presence of seamed bands.

Also, the variations in band thickness apparent when using the non-interlaced technique have been significantly reduced or eradicated through use of this recursive, line-interlaced technique (omitting post processing). It appears that the same intra-band thermal gradients present in non-interlaced printing are not present in recursive, line interlaced printing.

Three additional benefits are present when utilizing this recursive print technique: firstly, that it can be expanded to accommodate any even number of jets, secondly that only one step size is required, as can be calculated from the vertical print resolution and the number of jets in the print head, thirdly that high throughput bidirectional printing is supported by this technique.

Color Print Heads

It will be appreciated that the present invention is not limited to a single color ink jet printer. The present invention is equally applicable to a color ink jet printer, provided the guidelines set out above are maintained. The only difference will be that all the available colors (e.g., black, cyan, magenta and yellow) are laid down individually or in combination in pixel rows in accordance with the guidelines. For example, a print head for use with a color ink jet printer is disclosed in a co-pending application assigned to the same assignee as the present application Ser. No. 07/433,948, filed Nov. 9, 1989, now abandoned and incorporated herein by reference. By modifying the print head disclosed therein so that the 8th and 9th jets of each color are spaced by 3 pixels (instead of two as in the co-pending application), the method and system of the present invention may be practiced.

Specifically, the print head has 16 jets per color. The top 8 jets of each color would be covering the odd numbered pixel rows and the lower 8 jets would be covering the even numbered pixel rows. This method is described below again with reference to FIG. 4.

In the first pass, only the lower 8 jets would be activated to cover pixel rows 18, 20, 22, 24, 26, 28, 30, 32. The paper is then stepped by a step of 16 pixel rows, positioning the 17th pixel row to the top jet of each color.

In the next pass, the top 8 jets of each color covers pixel rows 17, 19, 21, 23, 25, 27, 29, 31. With the exception of row 17, all of them are sandwiched between two pixel rows of ink that was printed in the previous pass thus satisfying guideline #2. Pixel row #17 is the first pixel row of the pattern and thus satisfy guideline #3. The bottom 8 jets of each color covers pixel rows 34, 36, 38, 40, 42, 44, 46, 48. All these rows are printed on virgin paper and therefore satisfy guideline #2. At the end of this pass, the paper is advanced by a step of 16 pixels and the process repeats again.

Using The Print Head of FIG. 1

It will be appreciated that there are many other print head configurations and processes using them which satisfy the guidelines for thermal symmetry expressed above. Thus, it will be evident that the print head of FIG. 1 can be used provided the process of jetting ink through the nozzles does not violate such thermal symmetry guidelines.

More specifically, the print head of FIG. 1 has 16 nozzles. The upper half of the nozzles (i.e., 1 to 8) comprise a first group U and lower half of the nozzles (i.e., 9 to 16) comprise a second group L. The odd numbered nozzles of the first (upper) group U (i e., 1, 3, 5 and 7) comprise a first sub-group U-O; and the even numbered nozzles of the second (lower) group L (i.e., 10, 12, 14 and 16) comprise a second sub-group L-E. These two sub-groups are the only jets ever fired. Jets 2, 4, 6, 8, 9, 11, 13 and 15 are not used. To summarize:

| Nozzles | Group | Activated |
| --- | --- | --- |
| 1, 3, 5 and 7 | Upper Odd (U-O) Nozzles | Yes. |
| 10, 12, 14 and 16 | Lower Even (L-E) Nozzles | Yes. |
| Jets 2, 4, 6, 8, 9, 11, 13 and 15 | Remaining Nozzles | No. |

With reference to FIG. 6, an alternative embodiment of the present invention can be implemented using the print head of FIG. 1 as follows:

(1) In the first pass (left to right; direction R), the paper is positioned to have pixel row 2 opposite nozzle 10. During the first pass, only sub-group L-E (jets 10, 12, 14, 16) are activated to cover pixel rows 2, 4, 6 and 8, respectively. Since, only even pixel rows are laid down, guideline #1 is satisfied; and since all covered pixel rows have virgin paper on both sides, guideline #2 is also satisfied.

(2) The paper is then stepped a number of pixel rows j where j is ½ the number of jets ("the stepping distance"). In the example of FIG. 1, this would mean that the paper is stepped 8 pixel rows. This positions the paper so that pixel row 1 is positioned opposite jet 1. During the second pass (right to left; direction L), sub-groups U-O (1, 3, 5 and 7) and L-E (10, 12, 14 and 16)

are both activated so as to cover pixel rows 1, 3, 5 and 7, and 10, 12, 14 and 16, respectively. Thus, by the end of the second pass, pixel rows 1 to 8 are covered, as well as pixel rows 10, 12, 14 and 16. Since pixel row 1 is the first pixel row in the dot pattern, guideline #3 is satisfied; since rows 3, 5 and 7 are laid down between previously filled in rows 2, 4, 6 and 8, guidelines ##1 and 2 are satisfied.

(3) The second step is then successively repeated for as many passes 3 to k as desired, and then on the k+1 pass (last pass) only sub-group U-O (jets 1, 3, 5 and 7) are activated thus completing the filled in block. The guidelines are satisfied for this last pass as shown in FIG. 6, where k is 4 (i.e., the total number of passes is 5) and the pixel rows covered are 1 to 32.

It is acknowledged that because jets 2, 4, 6, 8, 9, 11, 13 and 15 are not used, the throughput is one-half than if all jets were used. However, the throughput could be increased by simply increasing the number of jets.

Other Embodiments

While the description above refers to particular preferred embodiments of the present invention, it will be understood that many modifications thereto may be made without departing from the spirit or intended scope of the present invention. By way of example only, the present invention would be applicable to any ink jet printer wherein the ink is heated to an elevated temperature prior to being jetted. That is, the present invention is not necessarily limited to phase change ink jet printers. Also, the present invention can be used where rather than stepping the paper, the print head is stepped or the paper and the print head are both stepped; it is relative movement that is pertinent to the present invention. Further, it will be appreciated that there are many other print head configurations and processes using them which satisfy the guidelines for thermal symmetry expressed above (e.g., where the print head configuration of FIG. 3 is used, but with the spacing between jets 8 and 9 being 2*V as it is with all other jets, various ordering schemes will be apparent to the skilled artisan for practicing the present invention). Additionally, there are advantages in applying guideline #1 even though the further benefits of implementing guideline #2 are not taken advantage of.

Thus, the accompanying claims are intended to cover such modifications as would fall within the true scope and spirit of the present invention. The presently disclosed embodiments are therefore to be considered in all respects as illustrative and not restrictive, the scope of the invention being dictated by the appended claims, rather than the foregoing description, and all changes which come within the meaning and range of equivalency of the claims are therefore intended to be embraced herein.

What is claimed is:

1. A process for printing in an ink jet printer having a print head comprised of a plurality of spaced jetting nozzles for jetting heated ink droplets onto a substrate comprised of a plurality of pixel rows during successive passes of the print head over the substrate, the process comprising:

causing the print head to effect a plurality of passes across a print region defined by a plurality of successive pixel rows of the substrate so that during each pass, each nozzle scans a respective pixel row, and jetting ink drops onto the substrate, wherein during each pass the nozzles scan pixel rows which are not adjacent one another and which are different from pixel rows scanning during preceding passes; and during scanning of each pixel row in a print region other than the first and last pixel rows, the two rows which are adjacent that row have either been previously scanned during preceding passes or have not been previously scanned during the preceding pass.

2. The process of claim 1 wherein said step of causing the print head to effect a plurality of passes is repeated one or more times for successive print regions, wherein each successive print region is defined by a plurality of consecutive pixel rows on the substrate and is adjacent to the immediately preceding print region.

3. The process of claim 2 wherein a first set of pixel rows are even numbered rows in the print region and a second set of pixel rows are odd numbered rows in the print region.

4. The process of claim 3 wherein the ink is a phase change ink and the printer is a phase change ink jet printer.

5. The process of claim 4 wherein the phase change ink jet printer is of the impulse type.

6. The process of claim 2, wherein at least one print region is rectangular.

7. The process of claim 3 wherein at least one print region is rectangular.

8. In an ink jet printer having a print head comprised of an even numbered m of jetting nozzles for jetting heated ink droplets onto a substrate comprised of a plurality of pixel rows during successive passes of the print head over the substrate, the improvement comprising:

(a) all the nozzles having a uniform vertical spacing corresponding to two pixel rows, except for the vertical spacing between nozzles j and k which is three pixel rows, where j and k are 0.5 m and 0.5 m+1, respectively; and (b) control means for positioning the substrate and activating selected nozzles, said control means having means for:

1) positioning the substrate so that a predetermined pixel row is opposite nozzle k, and then activating only nozzles k to m during a first pass of the print head;

2) subsequently advancing the substrate m pixel rows and then activating all the nozzles 1 to m during a second pass of the print head; and 3) repeating function (2) for all successive passes of the print head except the last pass which differs from function (2) in that only nozzles 1 to j are activated.

9. The printer of claim 8 wherein the nozzles are arranged in a slanted array.

10. The printer of claim 9 wherein a horizontal distance between two adjacent nozzles is seven times the uniform vertical spacing between adjacent nozzles.

11. The printer of claim 10 wherein the horizontal distance between two adjacent nozzles is 14/240th of an inch.

12. The printer of claim 8 wherein m is in the set {16, 32, 48, 64}.

13. In an ink jet printer having a print head comprised of $2^n$ jetting nozzles, wherein n is a positive integer no less than 4, for jetting heated ink droplets onto a substrate comprised of a plurality of pixel rows during successive passes of the print head over the substrate, the improvement comprising:
  (a) all the nozzles having a uniform vertical spacing corresponding to one pixel row; and
  (b) control means for positioning the substrate and activating the nozzles, said control means having means for;
    1) activating only nozzle j where j is $(0.5 * 2^n + 2)$ and every other nozzle thereafter up to $2^n$ during a first pass of the print head;
    2) advancing the substrate k pixel rows and then activating only nozzle 1 and every other nozzle thereafter up to $k-1$, and nozzle j and every other nozzle thereafter up to $2^n$, during a second pass of the print head, where R is $(0.5 * 2^n)$; and
    3) repeating function (2) for all successive passes of the print head except the last pass which differs from function (2) in that only nozzles 1 and every other nozzle up to $k-1$ are activated.

14. The printer of claim 13 wherein the nozzles are arranged in a slanted array.

15. The printer of claim 14 wherein a horizontal distance between two adjacent nozzles is fourteen times the uniform vertical spacing between adjacent nozzles.

16. The printer of claim 15 where the horizontal distance between two adjacent nozzles is 14/240th of on inch.

17. The printer of claim 13 wherein n is in the set {4, 5, 6} so that the total number of nozzles is in the set {16, 32, 64}.

18. The printer of claims 9 or 14 wherein at least one print region is rectangular.

19. An improved print head for an ink jet printer for jetting heated ink droplets onto a substrate comprised of a plurality of pixel rows during successive passes of the print head over the substrate, the improvement comprising:
  (a) the print head having an even number m of nozzles wherein the vertical spacing between the nozzles is uniform and corresponds to two pixel rows, except for the spacing between nozzles j and k which corresponds to three pixel rows, where j and k are 0.5 m and 0.5 m+1, respectively.

20. The print head of claim 19 wherein the nozzles are arranged in a slanted array.

21. An improved print head for an ink jet printer in which the print head is movable in a scanning direction and comprises a row of nozzles for projecting droplets of heated ink onto a substrate which is advanced past the print head in a substrate feed direction which is perpendicular to the scanning direction, the row of nozzles being inclined to the scanning direction, the improvement comprising:
  (a) the print head having an even number m nozzles wherein the spacing between nozzles in the substrate feed direction is uniform and corresponds to two pixel rows, except for the spacing between nozzles j and k which corresponds to three pixel rows, where j and k are 0.5 m and 0.5 m+1, respectively.

22. The print head of claims 20 or 21 wherein a horizontal distance between two adjacent nozzles is seven times the uniform vertical spacing between adjacent nozzles.

23. The print head of claim 22 wherein the horizontal distance between two adjacent nozzles is 14/240th of an inch.

24. The print head of claims 19 or 21 wherein m is in the set {16, 32, 48, 64}.

25. In an ink jet printer having a print head which has a plurality of spaced jetting nozzles for jetting heated ink droplets onto a substrate comprised of a plurality of pixel rows during successive passes of the print head over the substrate, the improvement comprising:
  control means for controlling the print head and the substrate position, said control means having:
    (a) means for causing the print head to
      (i) jet one or more heated ink droplets onto each of a first set of a plurality of nonadjacent pixel rows in a print region on the substrate during a first pass of the print head, said print region being defined by a plurality of consecutive pixel rows, and
      (ii) jet one or more heated ink droplets onto each of a second set of a plurality of nonadjacent pixel rows in the same print region in a second pass of the print head; and
    (b) a means for ensuring that at least for each pixel row other than the first and last pixel row in the print region, whenever a droplet is jetted onto a certain dot position in a pixel row in the print region, a corresponding dot position in the two pixel rows adjacent thereto (i) have droplets jetted therein during preceding passes or (ii) neither has droplets jetted therein during the preceding pass.

26. In an ink jet printer having a print head which has a plurality of spaced jetting nozzles for jetting heated ink droplets onto a substrate comprised of a plurality of pixel rows during successive passes of the print head over the substrate, the improvement comprising:
  control means for controlling the print head and the substrate position, said control means having:
    (a) means for causing the print head to
      (i) jet one or more heated ink droplets onto each of a first set of a plurality of nonadjacent pixel rows in a print region on the substrate during a first pass of the print head, said print region being defined by a plurality of consecutive pixel rows, and
      (ii) jet one or more heated ink droplets onto each of a second set of a plurality of nonadjacent pixel rows in the same print region in a second pass of the print head;
  wherein the control means operate recursively for successive print regions, wherein each successive print region is defined by a plurality of consecutive pixel rows on the substrate and is adjacent to the immediately preceding print region.

27. The print head of claims 25 or 26 wherein the first set of pixel rows are the even numbered rows in the print region and the second set of pixel rows are the odd numbered rows in the print region.

28. The print head of claim 27 wherein the ink is a phase change ink and the printer is a phase change ink jet printer.

29. The print head of claim 28 wherein the phase change ink jet printer is of the impulse type.

30. The print head of claims 20 or 21 or 26 wherein at least one print region is rectangular.

31. The print head of claim 27 wherein at least one print region is rectangular.

* * * * *